US009988596B2

(12) United States Patent
Redding et al.

(10) Patent No.: US 9,988,596 B2
(45) Date of Patent: Jun. 5, 2018

(54) CONTROLLED GERMINATION APPARATUS

(71) Applicant: Salish Coast Enterprises, Inc., Burlington, WA (US)

(72) Inventors: William D. Redding, Edison, WA (US); Wayne E. Carpenter, Mt. Vernon, WA (US)

(73) Assignee: SALISH COAST ENTERPRISES, INC., Burlington, WA (US)

( * ) Notice: Subject to any disclaimer, the term of this patent is extended or adjusted under 35 U.S.C. 154(b) by 0 days. days.

(21) Appl. No.: 15/051,557

(22) Filed: Feb. 23, 2016

(65) Prior Publication Data

US 2016/0244702 A1 Aug. 25, 2016

Related U.S. Application Data

(60) Provisional application No. 62/119,889, filed on Feb. 24, 2015.

(51) Int. Cl.
| | |
|---|---|
| *C12C 1/033* | (2006.01) |
| *A01C 1/02* | (2006.01) |
| *C12C 1/125* | (2006.01) |
| *A23L 7/104* | (2016.01) |

(52) U.S. Cl.
CPC .............. *C12C 1/033* (2013.01); *A01C 1/02* (2013.01); *A23L 7/104* (2016.08); *C12C 1/125* (2013.01); *A23V 2002/00* (2013.01)

(58) Field of Classification Search
CPC ............ A01C 1/02; A23L 1/105; C12C 1/033
See application file for complete search history.

(56) References Cited

U.S. PATENT DOCUMENTS

| | | | | |
|---|---|---|---|---|
| 46,985 | A | * 3/1892 | Deininger | ............... C12C 1/033 |
| | | | | 435/291.8 |
| 504,478 | A | * 9/1893 | Meyer | ..................... C12C 1/033 |
| | | | | 435/291.8 |
| 3,849,255 | A | 11/1974 | Schlimme et al. | |
| 2007/0160710 | A1 | 7/2007 | Van Dieren et al. | |

FOREIGN PATENT DOCUMENTS

| | | |
|---|---|---|
| GB | 190404294 | 12/1904 |
| GB | 648711 | 1/1951 |
| GB | 957617 A | 5/1964 |
| GB | 28561 | 9/2010 |
| WO | 88002396 † | 4/1988 |
| WO | 0015756 | 3/2000 |
| WO | 2005005592 | 1/2005 |
| WO | 2016138040 | 9/2016 |

OTHER PUBLICATIONS

PCT/US2016/019196, "International Search Report and Written Opinion," dated Jun. 9, 2016, 12 pages.

\* cited by examiner
† cited by third party

*Primary Examiner* — Hamid R Badr
(74) *Attorney, Agent, or Firm* — Kilpatrick Townsend & Stockton LLP

(57) ABSTRACT

Embodiments herein disclosed relate to a computer-controlled germination system built around a rotating vessel within which a germinating process takes place. The system includes automatable controls over air flow, water flow, temperature, and vessel rotation.

20 Claims, 12 Drawing Sheets

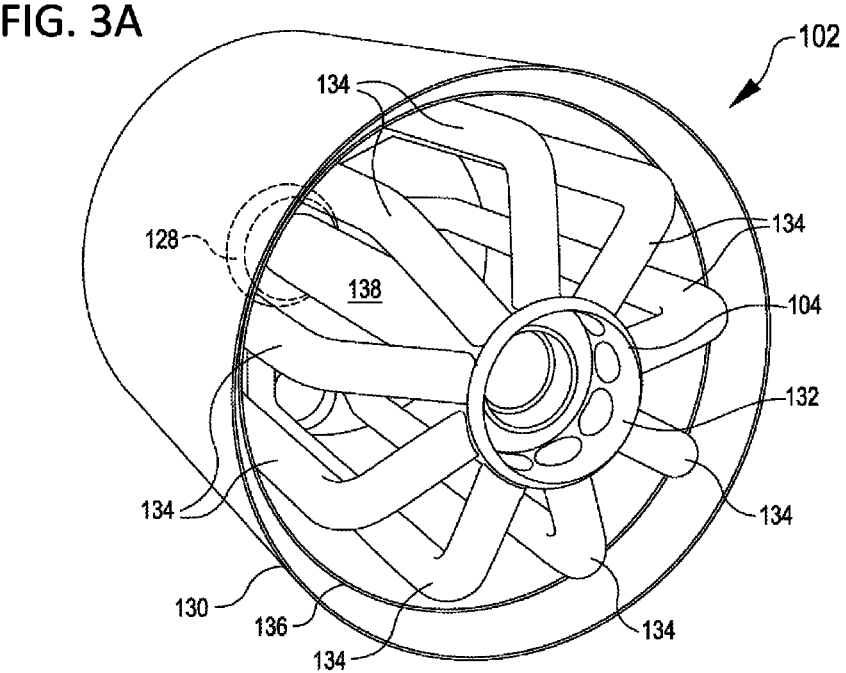

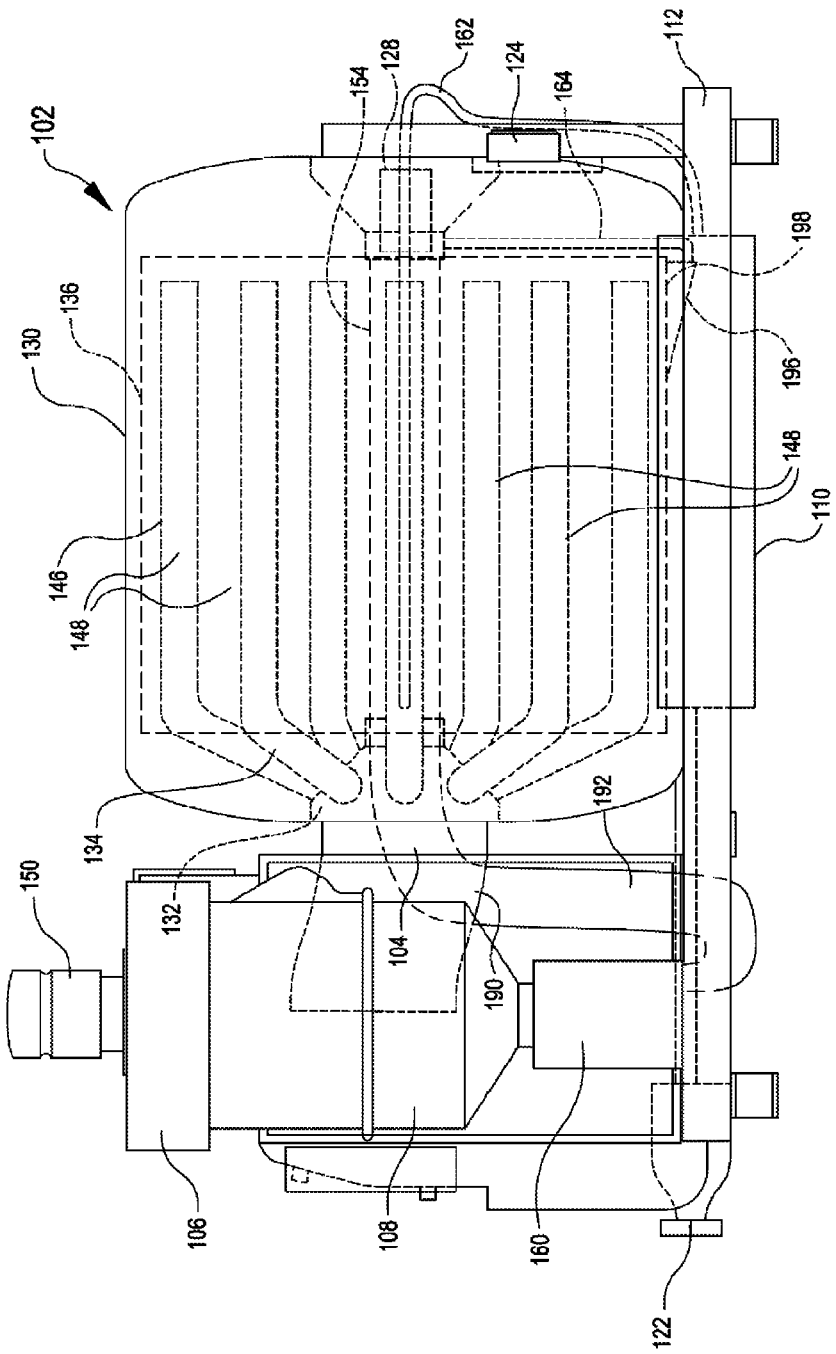

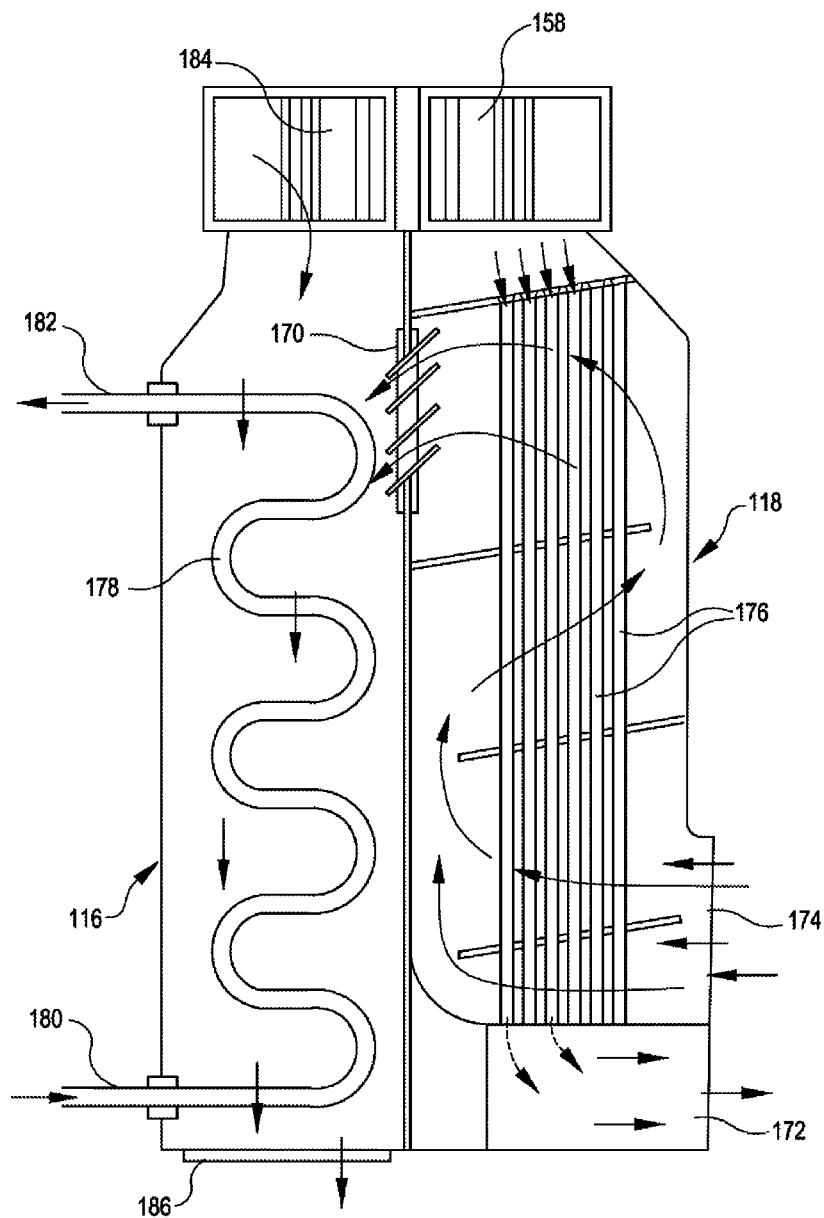

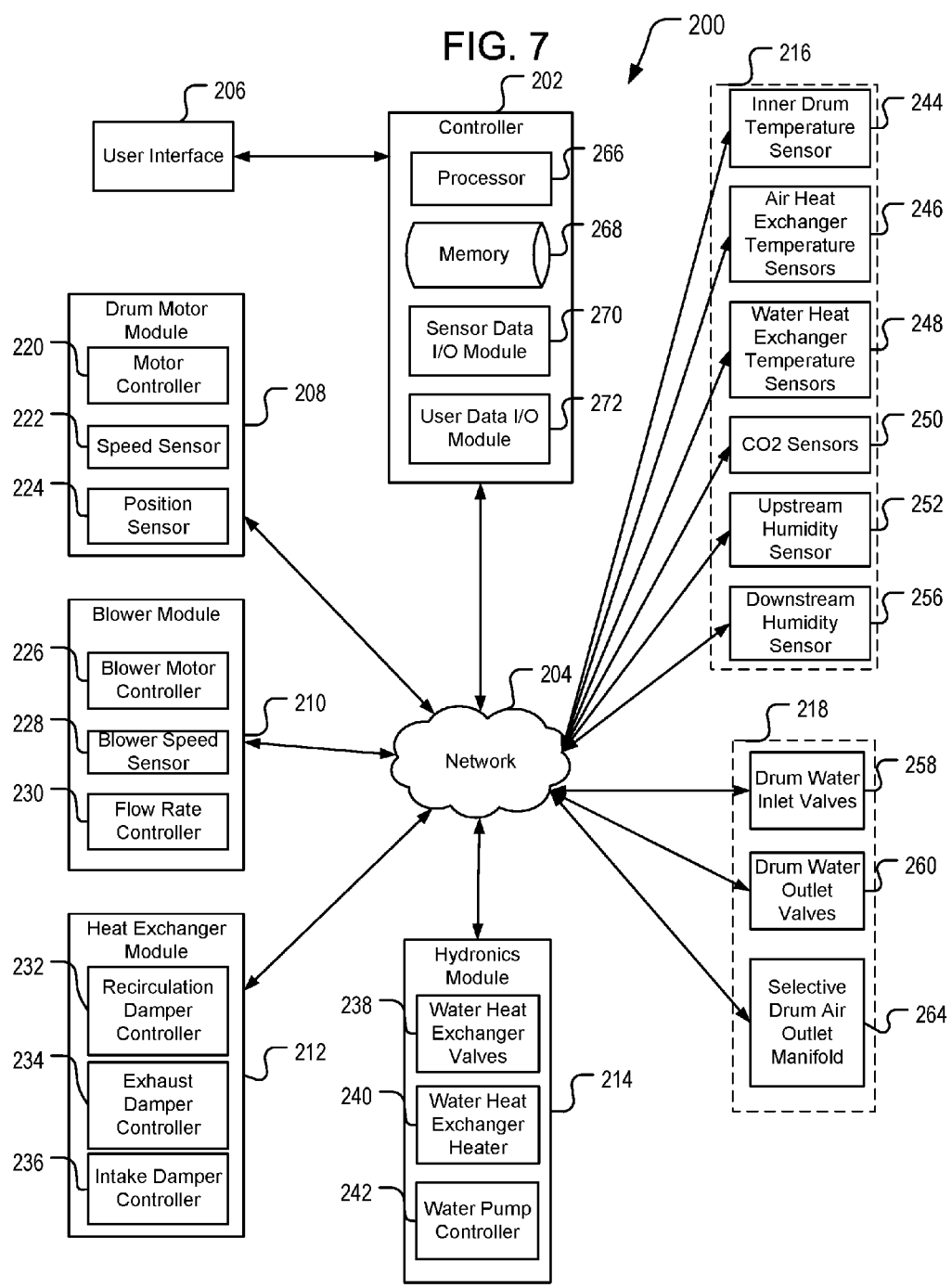

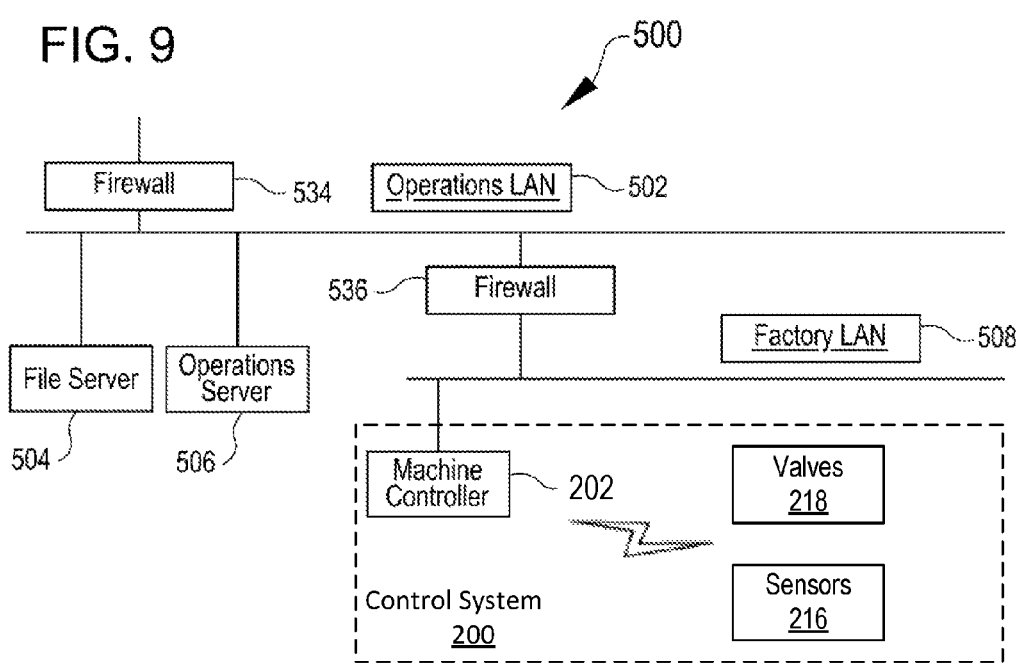

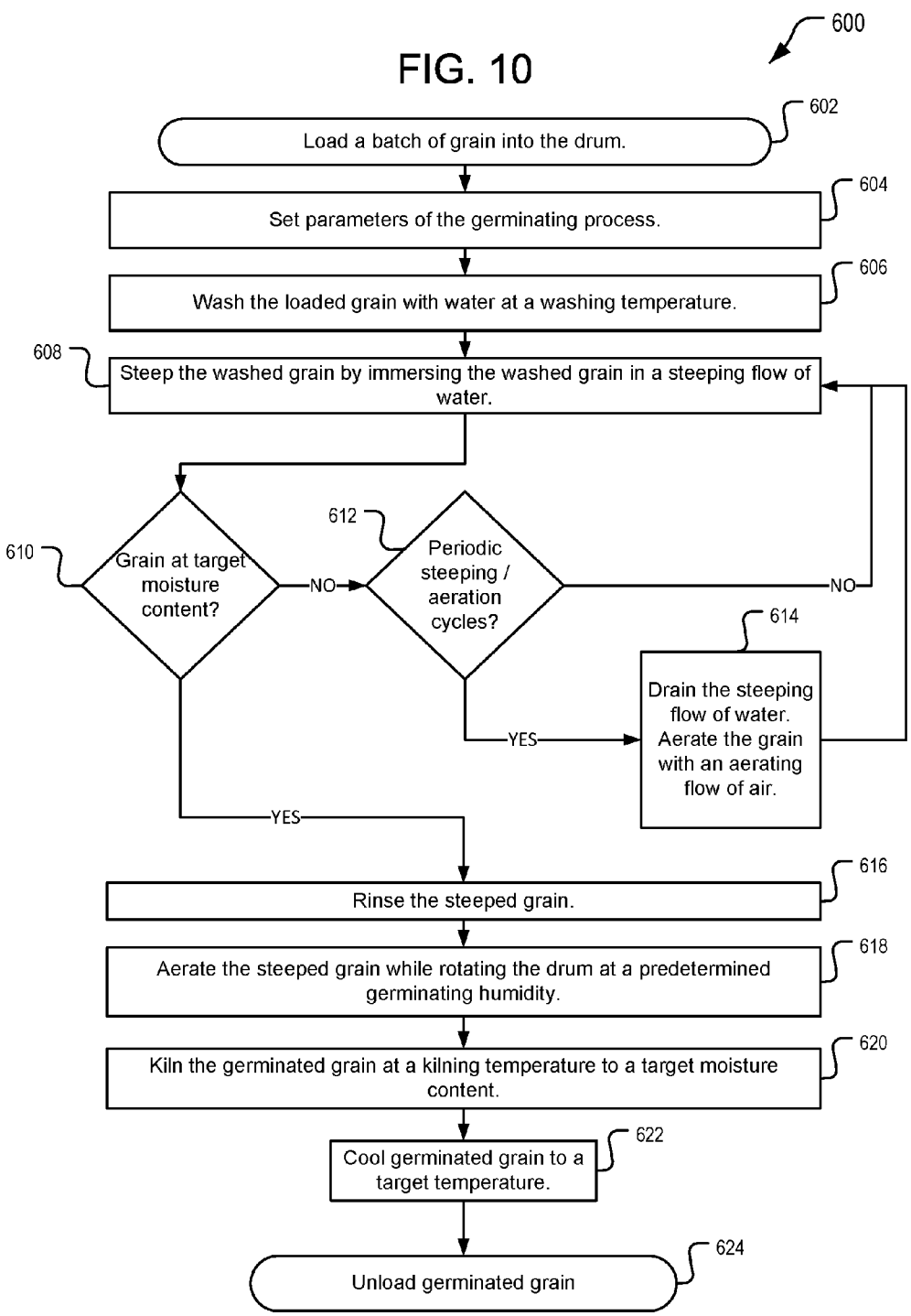

CONTROLLED GERMINATION APPARATUS

CROSS-REFERENCES TO RELATED APPLICATIONS

This application claims the benefit of U.S. Provisional Application No. 62/119,889, filed Feb. 24, 2015, the contents of which are incorporated by reference herein.

BACKGROUND

Malting is an ancient process that has been practiced for thousands of years to prepare grains for human consumption and is most commonly applied to barley to create malt, a fundamental ingredient in beer and some types of whiskeys. The grain is initially washed and soaked in a manner that induces germination. The germinated grain is allowed to develop for a proscribed time before the application of heat dries the partially sprouted grain, yielding the malt product. The malt can subsequently be used in traditional baking, brewing and distilling processes or processed further into powder or syrup for broad use in food preparation. These latter steps are not considered part of the malting process.

Timing, temperature and other process parameters for malting are so dependent on the particular grain variety, the specific state of the live grain, and the intended flavor characteristics of the final malt product that it has typically been the responsibility of an artisan practitioner, the maltster, to oversee the process from start to finish. Malting systems evolved from simple baskets that held the grain through soaking and germination and open air drying to more sophisticated malt houses which were the pinnacle of floor malting, the most commonly used system from the 1600's through the 1800's. In floor malting, the maltster soaks and germinates the grain in large vessels, then manually spreads and stirs the grain on a specially designed floor using rakes and shovels. The maltster relies on acquired experience and skill to properly apply water, air and heat during the various process stages to yield the desired malt product.

Since the mid-1800's there have been numerous mechanical systems applied to malting, but the current state-of-the-art still tends towards multi-stage systems; and while most modern systems utilize computer controls to automate the malting process, all still require that operators possess considerable artisanal skill to produce a quality malt product.

BRIEF SUMMARY

Embodiments herein disclosed relate to an automated system for the germination and sprouting of grain for various applications, including malting. Specific embodiments relate to a computerized machine in which the germination, sprouting and malting process takes place. At least one embodiment includes a computer-controlled system built around a single rotating Galland-style drum within which steeping, germination, sprouting and drying activity can take place. The system may be powered by electricity, while the system may require external sources of water and air; the system may achieve an unprecedented level of energy efficiency as compared to existing germination systems via drum design and/or a closed loop energy recovery and exchange cycle.

Embodiments may include a range of machines that support capacities of 50 pounds to over 40,000 pounds of malt per batch. The targeted capacity affects the physical dimensions of the germination system as well as the volume and rate requirements for the external resources. However, physical dimensions of the germination system, as well as volumes and rates of use of external resources, may scale to accommodate any suitable batch size.

For a fuller understanding of the nature and advantages of the present invention, reference should be made to the ensuing detailed description and accompanying drawings.

BRIEF DESCRIPTION OF THE DRAWINGS

FIG. 3A is a partial cutaway, perspective view of a drum component of the automated germinating apparatus of FIGS. 1-2;

FIG. 5A is a front schematic view of the automated germinating apparatus of FIGS. 1-2;

FIG. 6 is a schematic view of components of an air system of the automated germinating apparatus of FIGS. 1-2;

FIG. 7 is a block diagram illustrating a system for operating an automated germinating apparatus, in accordance with embodiments;

FIG. 9 is a block diagram illustrating a software environment for operating an automated germinating apparatus in accordance with embodiments; and FIG. 10 is a block diagram illustrating an example germination process for use in an automated germinating apparatus in accordance with embodiments.

DETAILED DESCRIPTION

Figure 1:
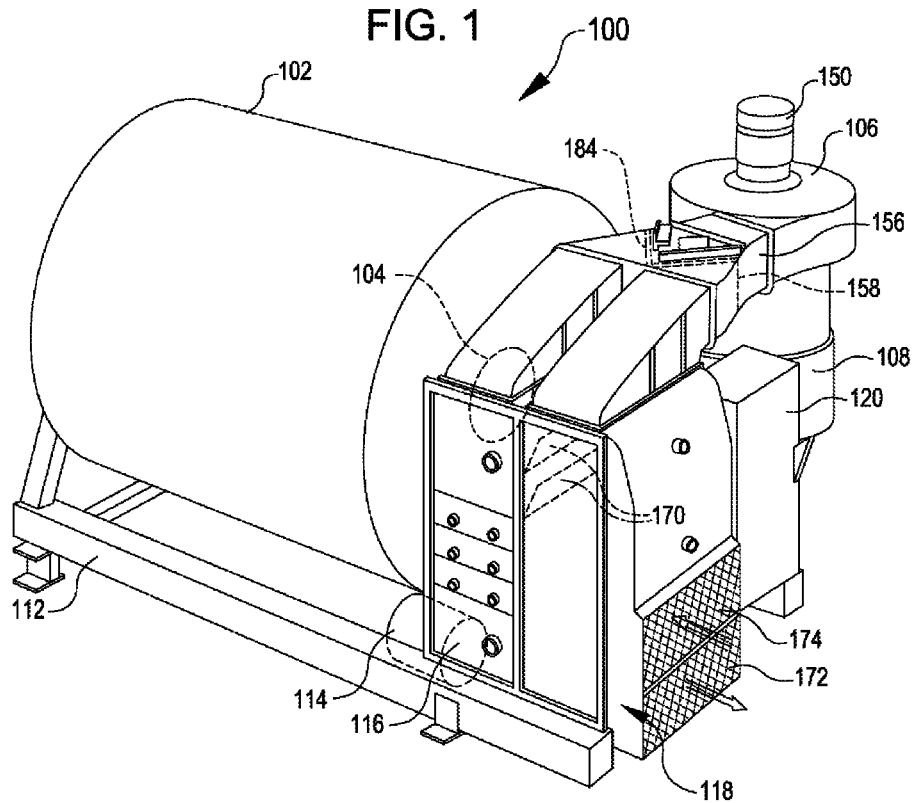
FIG. 1 is a back perspective view of an automated germinating apparatus, in accordance with embodiments.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Embodiments relate to an apparatus for malting grain that includes a rotatable drum that can hold a batch of grain. An apparatus for malting grain may include an air conduit in the rotatable drum for inserting a flow of air into the drum, and an array of tubes in the rotatable drum for withdrawing a flow of air from the drum. In some cases, the array of tubes may be used for inserting the flow of air into the drum, with a central air conduit used for withdrawing the flow of air. An air rotary union may connect the air conduit with an inlet flow of air and connect the array of tubes with an outlet for exhausting the air. A water inlet pipe may be arranged in the drum for inserting an inlet flow of water into the rotatable drum, and a water outlet may be inserted into the rotatable drum for withdrawing an outlet flow of water. A water rotary union may connect the water inlet pipe with a water inlet and connect the water outlet pipe with a water outlet. The rotatable drum can receive and exhaust flows of air and water via the air conduit, array of tubes, water inlet pipe, and water outlet pipe under the control of a computerized control system. The computerized control system may also control rotation of the rotatable drum, and control temperatures and humidity levels of the flows of air and water in the drum in order to optimally malt grain.

Embodiments may relate to a method for malting grain in a germinating apparatus as described above. For example, a method of malting grain may include loading a batch of grain in to a germinating apparatus. The batch of grain may be washed via a washing cycle. The batch of grain may be steeped in a flow of water, or may be steeped by immersion in water in the drum until the batch of grain reaches predetermined moisture content. The batch of grain may be rinsed, and may be aerated. In some cases, the batch of grain may be aerated, which may include being aerated at a predetermined temperature and humidity by passing a flow of air at a predetermined temperature and humidity through the grain in the drum. The batch of grain may be dried via kilning at a high temperature to a predetermined moisture content. The batch of grain may be cooled in the drum and unloaded from the apparatus. Any or all of the above steps may be iterated or repeated according to either a preset or a user-determined sequence of steps, and may be performed based on a physical parameter of the grain or apparatus (e.g., a grain moisture content, an air or water temperature, or a measure of time). The drum may be rotated during any of or any selection of the above acts.

Referring now to the drawings, in which like reference numerals represent like parts throughout the several views, FIG. 1 shows a back perspective view of an automated germinating apparatus 100, which includes a rotatable Galland-style drum 102 connected and supported by a frame 112. The drum 102 can be rotated via an electric motor 114 in accordance with embodiments.

Air handling features can be provided for directing air into, and/or drawing air from, the drum 102. For example, for drawing air from the drum 102, the drum may receive and exhaust air via an air rotary union 104 in the end of the drum. The air rotary union 104 can be fluidly connected with a cyclone assembly 108 and a blower 106. The blower 106 can draw air from the air rotary union 104, i.e., exhaust air from within the drum 102, and cause the exhaust air to circulate in the cyclone assembly 108 in order to dislodge particulates and/or debris from the exhaust air. The exhaust air can be directed through a diverter 156 which can include an upper damper assembly made up of an exhaust damper 158 and a recirculation damper 184. The recirculation damper 184 can be arranged to block or allow passage through a first outlet of the diverter 156, and the exhaust damper 158 can be arranged to block or allow passage through a second outlet of the diverter. The diverter 156 can selectively pass the air from the blower 106 into a heat exchanger 116, into a recuperator 118 and subsequently to an exhaust 172, or both.

As stated previously, embodiments include an air intake system for the drum 102. For example, the recuperator 118 can include an air intake 174 which is arranged to take in air from the environment. In some embodiments, the air intake 174 is arranged to pass an intake flow of air in a counter flow arrangement with exhaust air exiting the exhaust 172. The intake flow of air from the recuperator 118 may be drawn into the heat exchanger 116 via an intake damper 170. The flow of air from the heat exchanger 116 may be passed into the drum 102 via the air rotary union 104 separated from the exhaust stream.

In the embodiment shown in FIG. 1, a controller housing 120 is included for connecting a control system with aspects of the apparatus. For example, the air intake and exhaust systems can be monitored and temperature maintained via a computer system contained in part by controller housing 120. The controller housing 120 may be electrically connected with the blower 106 for controlling a rate of airflow, with the damper assemblies 158, 184, and 170 for controlling aspects of the air cycle, with the motor 114 for controlling a rate of rotation of the drum 102, with the water pump 122 (FIG. 2) for controlling a rate of flow of water in the drum 102, and with valves and sensors throughout the apparatus, as will be described further in reference to the systems of FIGS. 7-8.

Figure 2:
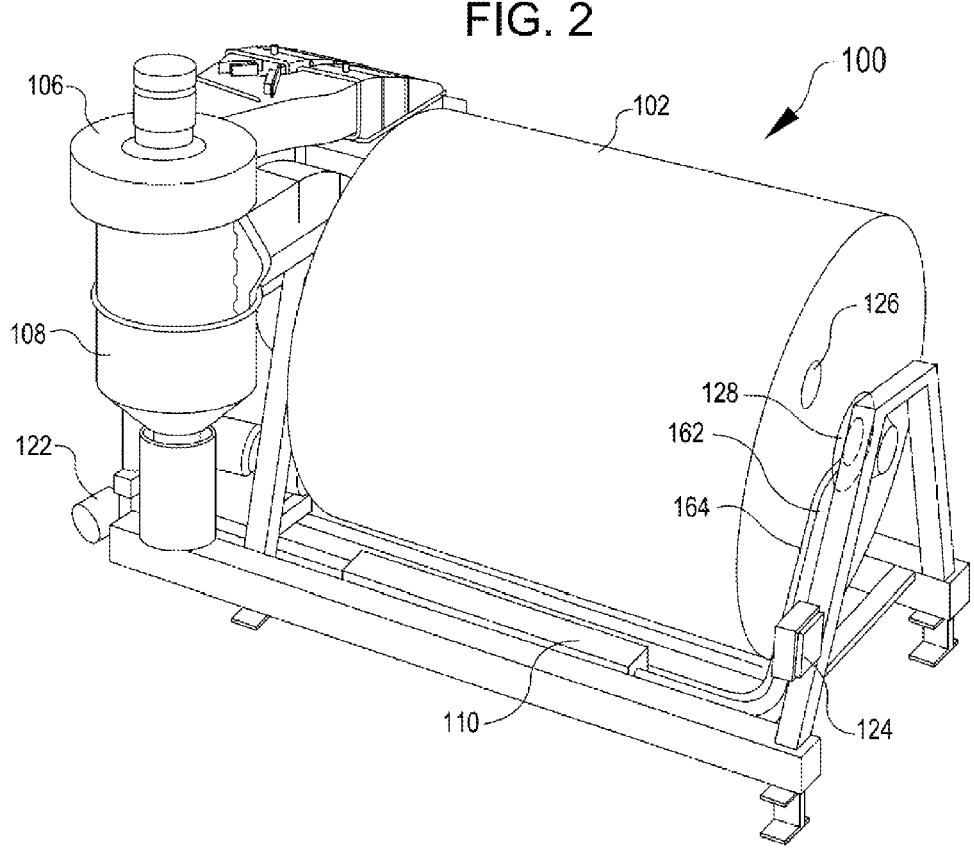
FIG. 2 is a front perspective view of the automated germinating apparatus of FIG. 1.

FIG. 2 shows a front perspective view of the automated germinating apparatus of FIG. 1. A water rotary union 128 at the end of the drum 102 opposite the air rotary union 104 connects plumbing for a water sub-system with the drum 102. Referring to the water subsystem, the water rotary union 128 connects a water inlet pipe 162 and a water outlet pipe 164 with the drum 102. The water inlet pipe 162 and water outlet pipe 164 can both pass through a water heat exchanger 110. In some embodiments, the water outlet pipe 164, or a portion of the water outlet pipe, can bypass the heat exchanger 110. A water pump 122 can direct a flow of water into the drum 102 via the heat exchanger 110 and the water rotary union 128. In some embodiments, the water pump 122 may direct a flow of water into the drum 102 bypassing the heat exchanger 110. A user interface 124 may be connected at any suitable external face of the apparatus 100, and may be configured to coordinate with the controller housing 120 for inputting user commands to the controller housing 120. A loading/unloading door 126 is located in an end of the drum, offset from the water rotary union 128, and can be operated when the drum is stopped for providing access to the interior for loading and unloading grain.

FIG. 3A shows the drum 102 housing an inner rectilinear drum 136, in a perspective view, in accordance with embodiments. Rotary unions are mounted outside of the inner drum on each end. An air rotary union 104 connects the drum 102 with the air subsystem including the air manifold 132 and center conduit 138. A water rotary union 128 opposite the air rotary union 104 connects the interior of the drum 102 with the water subsystem, including the water inlet pipe 162 (FIG. 2) and outlet pipe 164 (FIG. 2). The rotary unions 104, 128 can enable the drum 102 to be supported under rotation while allowing air and water to circulate through the drum.

The porous center conduit 138 may run through the center of the inner drum 136 and attach at each end. The air manifold 132 is mounted on one end of the inner drum 136, and terminates at a radial array 134 of porous tubes that run the length of inside of the inner drum. In embodiments, the center conduit 138 and/or radial array 134 of porous tubes may be formed of wedge wire tubing forming a wedge-wire conduit wall 154 (FIG. 4) made up of narrow, parallel members arranged in a tubular shape to form a tube wall with long and narrow gaps between the parallel members. The spacing of the parallel members is such that air and water can pass readily between the members without admitting grains, e.g., on the order of millimeters. The central conduit 138 is used for introducing a flow of air into the inner drum 136. The flow of air flowing into the inner drum 136 may, in some cases, originate from an intake, may be recirculated air previously removed from the drum 102, or may be a mix of both.

In some embodiments, the air manifold 132 can selectively cut off fluid connection (i.e., blocking flow of any fluid including air and water) with a subset of the radial array 134 of wedge-wire tubes. For example, the air manifold 132 may block one group of tubes in the radial array 134 near the bottom of the inner drum 136 while allowing airflow through tubes in the radial array near the top of the inner drum when the drum is rotating, so that air is passed through only a subset of tubes of the radial array 134 that is above a predetermined height level in the inner drum 136. By way of specific example, the air manifold 132 may also or alternatively block airflow from tubes in the radial array 134 that are above the grain bed, redirecting the air flow exclusively through the grain bed, thereby completely aerating the grain to assist the germination process. In some embodiments the selection mechanism can be dynamically adjusted while others it may be static. For example, in a static system, air manifold 132 may be arranged to mechanically obstruct a subset of tubes of the radial array 134 based on, e.g., the rotational position and/or heights of the tubes in the radial array relative to the air manifold. In a dynamic system, the air manifold 132 may be adjustable, e.g., by a user of the system and/or via computer control, to adjust an arrangement of the manifold so as to change which rotational positions and/or heights are obstructed. A dynamic selection system may be used to change the selection of the subset of tubes in the radial array 134 through which air is withdrawn from the drum 102. In some cases, the direction of airflow may be reversed, such that the selection mechanism selects which subset of tubes in the radial array are used to pass air into the drum 102.

Figure 3B:
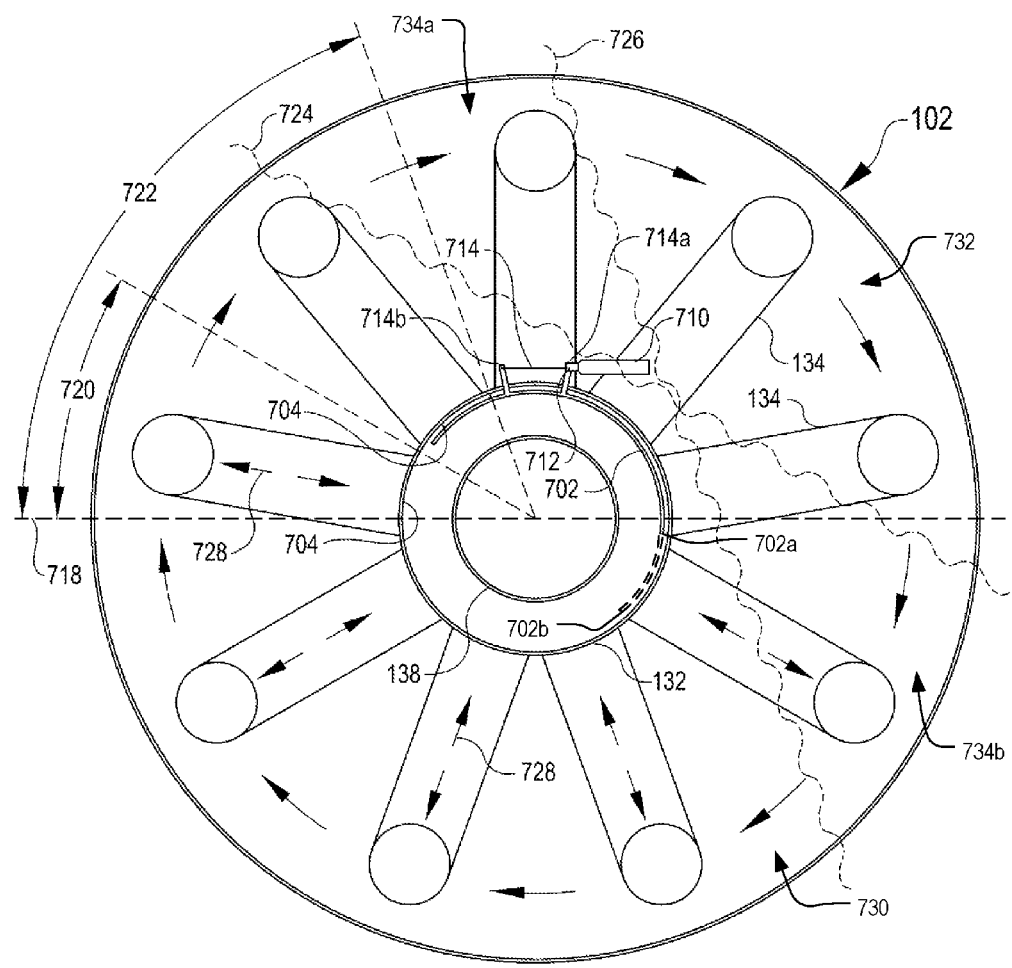
FIG. 3B is a side schematic view of the drum component of the automated germinating apparatus of FIGS. 1-2 and 3A.

FIG. 3B shows the drum 102 in a simplified side-view schematic, in accordance with embodiments. The center conduit 138 and air manifold 132 connect with the drum 102 at one end. The center conduit 138 is shown interior to the air manifold 132, and configured to separate flows of air flowing through the center conduit and the manifold. For example, a flow of air can flow in one direction through the center conduit 138 and in an opposite direction through the air manifold 132 (e.g., an inlet flow can flow into the drum 102 through the conduit and an outlet flow can flow out of the drum through the manifold, or vice versa).

A horizontal axis 718 is shown for reference. When in operation, the drum 102 can be rotated to mix the grain in the drum. The drum 102 is shown as configured for rotating clockwise with respect to the manifold 132, but it will be understood that a counterclockwise configuration may be realized. While the drum 102 is in rotation, a grain bed 730 therein may assume different attitudes depending on various attributes of the grain, but in particular depending on whether the grain is dry or wet, and the rotational speed of the drum 102. Typically, a wet grain bed will lie at a steeper angle of inclination than a dry grain bed. By way of example, a first angle of inclination 720 may describe an angle of an exemplary dry grain bed surface 724; and a second angle of inclination 722 may describe an angle of inclination of an exemplary wet grain bed surface 726. In either case, the grain bed surfaces may be curved. In some cases, the first angle of inclination may be approximately 30 degrees, but precise angles of inclination may vary depending on the size, shape, and dryness of the grain in the grain bed. In some cases, the second angle of inclination may by approximately 70 degrees, subject also to variance depending on the size, shape, and wetness of the grain. Various components of the drum 102 and air manifold 132 may be arranged to accommodate these angles of inclination.

The radial array 134 fluidly connects with the air manifold 132 at radial array openings 704 in the air manifold. In accordance with embodiments, as discussed above, at any point of rotation of the drum 102, the radial array 134 for passing air out from (or alternatively into) the drum 102 includes tubes both below and above the grain bed 724, 726. At any given time, an airflow 728 may be alternatively flowing from the drum 102 into the air manifold 132 (i.e., exhausting air from the drum 102) via the radial array 134, or may be flowing from the air manifold into the drum via the radial array. A valve plate 702 may be positioned in the air manifold 132 such that a portion of the radial array openings 704 of the radial array 134 is blocked off from the air manifold. Thus, the valve plate 702 may selectively block flow from a portion of the radial array 134 based on the relative position of the valve plate.

In some cases, the valve plate 702 may be positioned across a particular range of angles, such that a portion of the radial array 134 in that range of angles is blocked. For example, the range of angles blocked may include a subset of the radial array 134 that would be positioned in an air pocket 732 above the grain level caused by the angle of inclination 702, 722 of a grain bed surface 724, 726. In some cases, the range of angles blocked may include a subset of the radial array 134 that falls into intermediate regions 734a, 734b where the air pocket 732 may extend depending on whether the grain bed 730 is dry (e.g., 734a), wet (e.g., 734b), or at an intermediate level of dryness. The subsets of the radial array 134 through which air is passed and blocked may be selected in order to increase airflow in the vicinity of wet grain (e.g., at the bottom portion of the drum 102) while decreasing airflow through the subset of the array 134 near the top of the grain bed 730. In some cases, the valve plate may extend over approximately 150 degrees of the manifold, but various other blocking angles are possible depending upon the desired drying characteristics of the drum. By way of example, the valve plate 702 may extend alternatively over an arc of approximately 180, 170, 160, 150, 140, 130, 120, 110, 100, 90, 80, or 70 degrees, depending upon the amount of grain in the drum, the angle of the grain bed in the drum, and how wet the grain is in the drum. In some cases, the valve plate 702 may extend over an arc of less than 70 degrees. In some cases, more than one valve plate 702 may be provided, such that two or more subsets of the radial array 134 may be blocked at a time, e.g., to additionally block airflow in a lower portion of the drum 102 if the drum is filled with liquid.

The valve plate 702 may be static, such that the subset of the radial array 134 blocked by the valve plate remains fixed across a particular arc (with respect to a stationary horizontal axis 718). For example, the particular arc may extend from approximately 30 degrees (from the horizontal axis 718) to approximately 180 degrees. As another example, the valve plate 702 may also be configured to block a subset of the radial array 134 that extends above a particular height in the drum 102.

In some alternative embodiments, the valve plate 702 may be dynamic, such that the subset of the radial array 134 that is blocked may be varied by dynamic adjustment of the valve plate 702. For example, a valve plate 702 may be connected with an actuator 710 via a linkage 712. The actuator 710 may adjust the position of the valve plate 702 via the linkage 712 by moving the linkage between a first position 714b and a second position 714a, so as to move the valve plate 702 between a first plate position 702a and a second plate position 702b. The first and second plate positions 702a, 702b, may cause the valve plate 702 to selectively block different subsets of the radial array 134. Dynamically blocking different subsets of the radial array 134 can provide for improved airflow in the vicinity of grain in the grain bed 730 by reducing airflow through the air pocket 732 even while the position of the air pocket changes. In some cases, the valve plate 702 may be dynamically adjusted to selectively block a subset of the radial array 134 positioned in the air pocket 732. In some cases, the valve plate 702 may be dynamically adjusted in particular to selectively block a subset of the radial array 134 that falls within the intermediate regions 734a, 734b as the extent of the air pocket 732 changes, e.g., with the dryness of the grain bed 730. In some cases, the dynamic adjustment of the valve plate 702 may occur continuously; but in other cases, the dynamic adjustment of the valve plate 702 may occur between process steps of a germination process.

Figure 4:
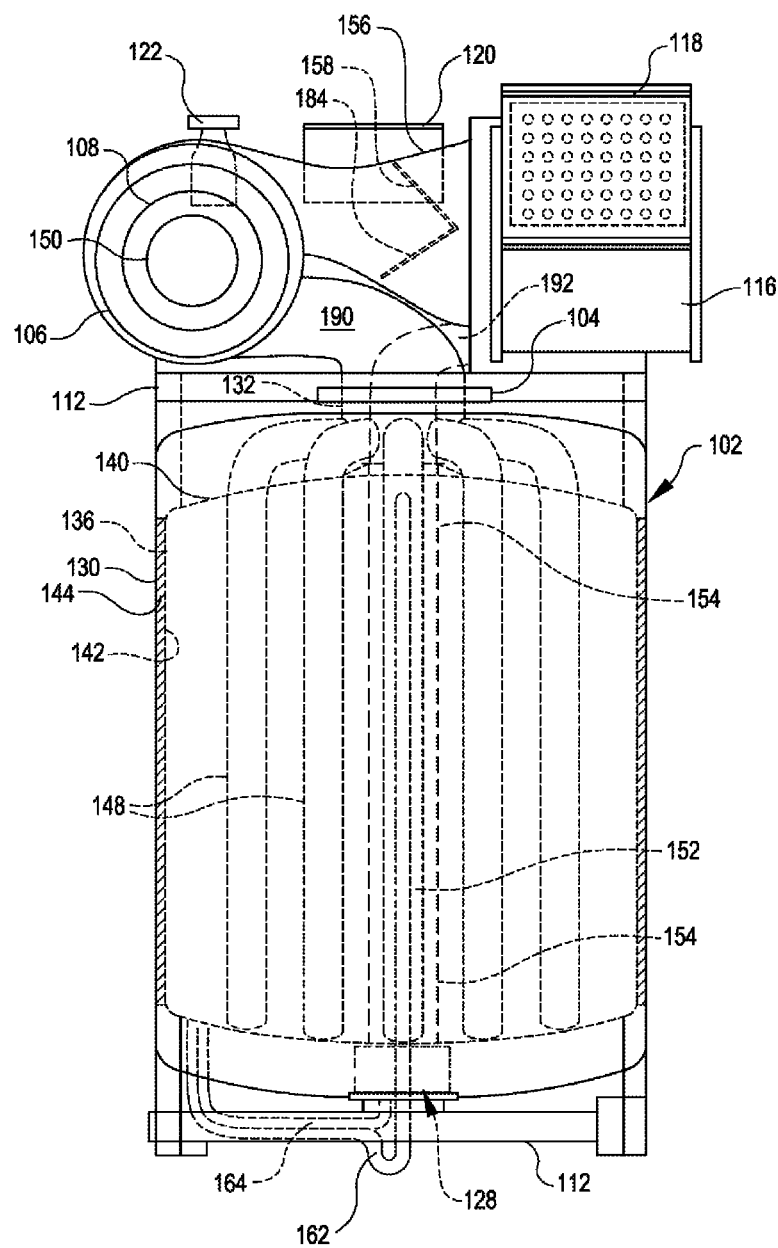
FIG. 4 is a top schematic view of the automated germinating apparatus of FIGS. 1-2.

FIG. 4 shows a top plan view of the germinating apparatus 100 shown in FIGS. 1-2, in further detail, in accordance with embodiments. The drum 102 has an outer wall 130 and an inner drum 136. Interstitial space between the inner drum 130 and outer wall 130 can support aspects of the air and water systems. Furthermore, space between the inner drum 136 and outer wall 130 may also be filled with an insulating layer 144 for mitigating heat loss from the inner drum 136, from air in the air system and from water in the water system. In some embodiments, insulation is also provided between the inner drum 136 and outer wall 130 at the ends of the drum 102. The insulating layer 144 may be filled with air, foam, insulation fibers, or any other suitable insulating material.

As described above, the air manifold 132 and ends of the radial array 134 may be located within the outer wall 130 but outside of the inner drum 136, while the radial array 134 and central conduit 138 penetrate into the inner drum 136. The radial array 134 penetrates into the inner drum 136 and may run a length of the inner drum 136. The radial array 134 may penetrate through an inner drum end 140 near the air rotary union 104. The radial array 134 may be used for exhausting the flow of air from the drum 102. The radial array 134 may include radial wedge-wire tubes 148. Like the central conduit 138, the wedge-wire tube walls 148 may also be sufficiently wide as to permit the passage of air and liquid, but generally too narrow to allow passage of grains.

A water central pipe 152 can penetrate into the drum 102 via the water rotary union 128 and into the inner drum 136. In some embodiments, the water central pipe 152 passes interior to a portion of the central conduit 138. The water central pipe 152 may be used for injecting water into the inner drum 136. A water outlet pipe 164 may also pass into the inner drum 136 via the water rotary union 128 and connect with a sump 196 (FIG. 5A).

In many embodiments, the blower 106 powers the flow of air through the apparatus. In particular embodiments, the blower 106 may be positioned downstream in the flow direction from the drum 102. For example, the radial array 134 may be used for drawing air out of the drum 102, whereupon the air passes out of the drum through the air manifold 132 and air rotary union 104. The blower 106 can pull the flow of exhaust air from the air rotary union 104.

In some embodiments, the exhaust air is drawn from the air rotary union 104 via an exit duct 190. In such embodiments, the exhaust air may be drawn by suction from the drum 102. For example, air may be passed through a grain bed within the drum 102 from the central conduit 138 to the radial array 134. In some embodiments, air may pass into a grain bed via some or all of a length of the central conduit 138 via the central conduit wedge-wire wall 154. The air may pass out of the grain bed via some or all of lengths of the radial array 134 via the radial array wedge-wire piping 148. The air may be drawn into the central conduit 138 by way of suction originating from the blower alone, or via one or more additional blowers. The air may be drawn into the central conduit 138 by way of the air rotary union 104 from a drum air inlet duct 192 from the heat exchanger 116. The air rotary union 104 and the manifold 132 cooperate to decouple the rotational position of the drum 102 from the intake and exhaust of air through the drum. For example, the air rotary union 103 and manifold 132 can permit air to pass into the drum 102 continuously (e.g., via the central conduit 138) while the drum is rotating or while the drum is static, and can also permit air to pass out of the drum 102 (e.g., via the radial array 134 and manifold 132) simultaneously and continuously, such that airflow is not interrupted by the rotation of the drum.

The blower 106 may pull the flow of exhaust air into a cyclone assembly 108, which can be shaped to form a vortex. The cyclone assembly 108 may, for example, be shaped in a conical shape, with the flow of exhaust air drawn in at an angle, such that a vortex can be generated in the flow of exhaust air by way of the momentum of the flow. The exhaust flow of air can be withdrawn from the cyclone at a central part of the vortex, such that debris entrained in the exhaust flow of air can be trapped by the cyclone without passing through to the blower 106. In some embodiments, a waste collector 160 is provided in conjunction with the cyclone assembly 108 in order to receive the debris that is removed from the exhaust flow of air. The formation of a vortex in the cyclone assembly 108 may be caused when a sufficiently high flow rate, powered by the blower 106, is achieved.

The blower 106, which can be powered by a blower motor 150, may be operated at variable speeds. In some processes, the blower 106 may be idled or left off, for example, when water alone is circulating in the drum 102. In some processes, the blower 106 may be operated at a high speed for generating a vortex in the cyclone assembly 108, for example, when the contents of the drum are being aerated. In some embodiments, the blower 106 may be operated at an intermediate speed. In some embodiments, the blower 106 outlets into an air diverter assembly 156, which can fluidly connect with either or both of a recuperator 118 and a heat exchanger 116. The diverter assembly 156 may connect with the recuperator 118 and heat exchanger 116 via an upper damper assembly made up of an exhaust damper 158 and a recirculation damper 184. The exhaust damper 158 can allow an exhaust flow of air from the blower 106 to exit the apparatus via the recuperator 118. The recirculation damper 184 can allow the exhaust flow of air from the blower 106 to recirculate within the apparatus by connecting the diverter assembly 156 with the heat exchanger 116, which can further connect with the drum 102 via a drum inlet duct 192. Further detail concerning the operation of the recuperator 118 and heat exchanger 116 is provided below with reference to FIG. 6.

Figure 5B:
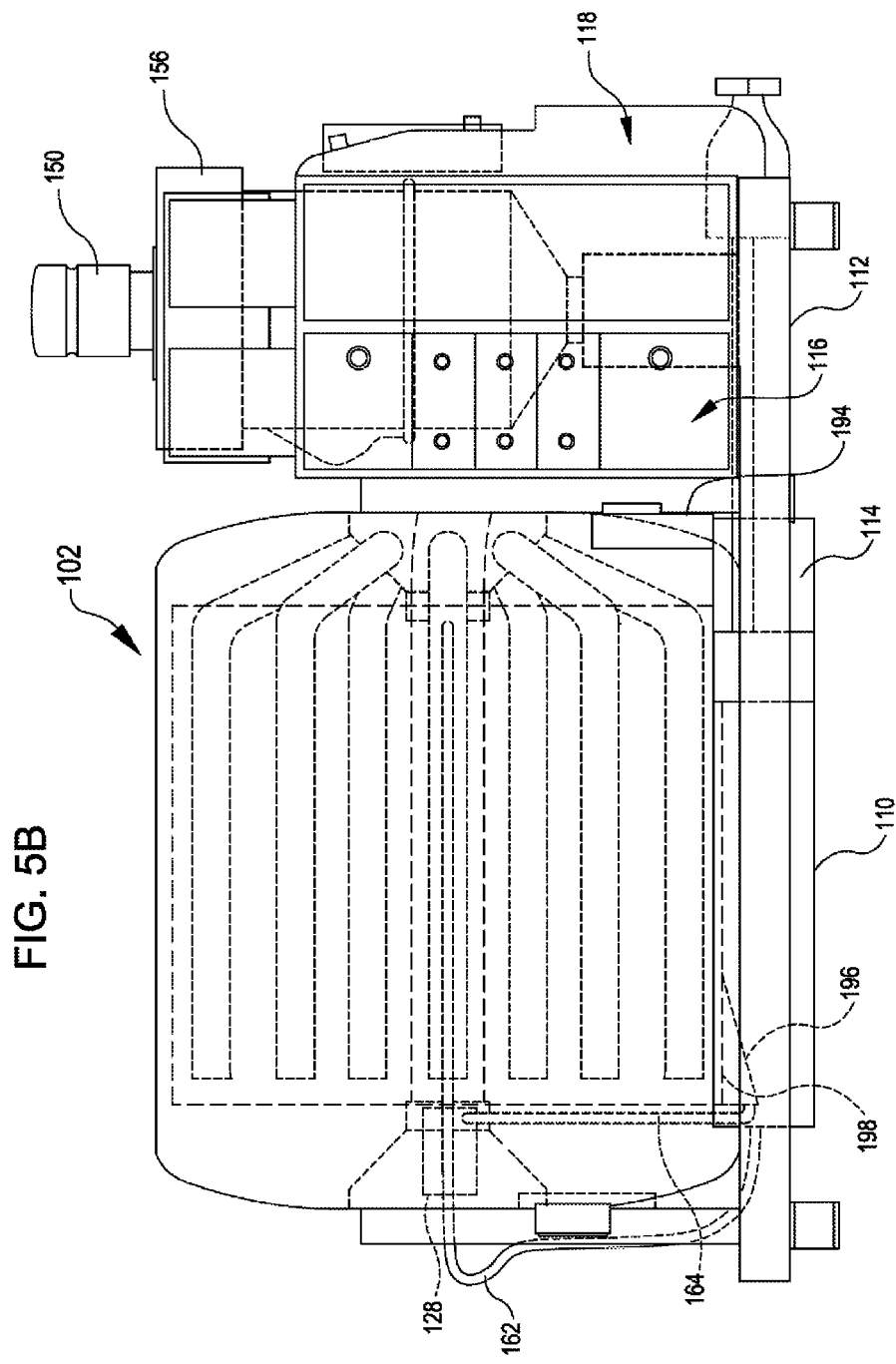
FIG. 5B is a back schematic view of the automated germinating apparatus of FIGS. 1-2.

FIGS. 5A and 5B show front and back side plan views of the apparatus 100 shown in FIGS. 1, 2 and 4. In FIG. 5A, aspects of the apparatus 100 are shown in greater detail, in accordance with embodiments. As described above, a water inlet pipe 162 may penetrate into the drum 102 via a central part of the water rotary union 128. The water inlet pipe 162 may be used for adding water to the drum 102. Water in the drum 102 may be removed from the drum via the sump 196, which can connect with the water outlet pipe 164. The sump 196 can include a projection from the inner drum 136 configured for receiving water. In some cases, the sump 196 can be separated from the inner drum 136 by a sump cover 198, which may be a wedge-wire grille, filter, mesh surface, or other suitable water-penetrable covering. Preferably, the sump cover 198 prevents passage of particles of grain. In FIG. 5B, a drum motor 114 is shown, which may be used for causing the drum 102 to rotate. The drum motor 114 may be connected with the frame 112, and may interact with the drum 102 via, for example, a mechanical linkage 194. The mechanical linkage 194 may include a belt, chain drive, contact wheel, or any other suitable linkage for imparting rotation.

FIG. 6 illustrates aspects of the heat exchanger 116 and recuperator 118 of FIGS. 1-2 in greater detail, in accordance with embodiments. Airflow within the exchanger 116 and recuperator 118 may be controllable by way of three dampers. The recirculating damper 184 can control a flow of air from the exhaust flow of the apparatus into the heat exchanger 116. The exhaust damper 158 can control a flow of air from the exhaust flow of the apparatus to the recuperator 118 and ultimately to the exhaust 172. An intake damper 170 can fluidly connect an intake 174 with the heat exchanger 116 via the recuperator 118, wherein an intake flow of air can pass in a counter flow with tubes 176 carrying the exhaust flow, so as to transfer heat from the exhaust flow to the intake flow.

The heat exchanger 116 may include a hydronic heat exchange element 178, which can take hot fluid (e.g., water) from a hot source inlet 180 and pass it in a counter flow against airflow in the heat exchanger 116 to a fluid outlet 182. In various embodiments, the hydronic heat exchange element 178 may be substituted with any other suitable heating element, such as a radiator, gas heat element, electric heat element, or similar element. The heated flow of air can pass out of the heat exchanger 116 via an air heat exchanger outlet 186, from which it may be directed to the drum 102 (FIGS. 1-2).

The dampers 158, 184, 170 may be opened or closed in various combinations and to varying degrees to achieve multiple air cycles as needed to adjust the water temperature, humidity, carbon dioxide content, and/or air temperature in apparatus. For example, in an intake and exhaust cycle, the exhaust damper 158 may be opened and the recirculation damper 184 may be closed. In such a cycle, all of the exhaust flow is exhausted from the apparatus via the recuperator 118, causing the apparatus to take in fresh air from the environment at the intake 174. An intake and exhaust cycle may result in a relatively low temperature, low humidity, and low carbon dioxide content compared to a recirculation cycle. An intake and exhaust cycle may also be used to reduce the temperature, carbon dioxide content, and humidity during operation of the apparatus. The reduction in temperature may be mitigated by increasing the heating rate by the heat exchanger 116, e.g., by increasing a flow rate and/or temperature of the working fluid in the heat exchange element 178, or by decreasing the flow rate of air through the apparatus.

In a recirculation cycle, the exhaust damper 158 is closed and the recirculation damper 184 is opened. In such a cycle, all or substantially all of the exhaust flow may be redirected back into the apparatus via the heat exchanger 116, which may result in higher temperatures, carbon-dioxide content, and humidity than achieved in the intake and exhaust cycle. In some cases, the exhaust damper 158 and the recirculation damper 184 may be opened at the same time to varying degrees, so as to moderate the temperature and/or humidity of the air within the apparatus. For example, when a temperature or humidity is too high, the exhaust damper may be increasingly opened, so as to increase an exhaust rate of the hot and humid exhaust air, and increase an intake rate of environmental air. When a temperature or humidity is too low, the exhaust damper may be increasingly closed while the recirculation damper is increasingly opened, so as to recirculate the already hot and humid exhaust air within the apparatus, where it can gain additional water content and heat.

FIG. 7 illustrates a system 200 for operating an automated germinating apparatus, such as the apparatus 100 shown in FIGS. 1-2, in accordance with embodiments. In the system 200, various modules may be provided for controlling aspects of an automated germinating apparatus. The modules may be software modules, hardware modules, or a combination thereof. If the modules are software modules, the modules will be embodied on a computer readable medium and processed by a processor in any of computer systems, such as the controllers, described herein. For example, a controller 202, which may be housed in the controller housing 120 shown in FIGS. 1-2, may be provided which can communicate with the various components via a network 204, which can include a wireless network, a collection of wired connections, or both. The controller 202 may also communicate with a user interface 206 for receiving instructions from a user. The controller can include a processor 266 and memory 268 for processing and storing instructions, and for storing and implementing predetermined programs, such as the modules in FIG. 7, for operating the various components. The controller 202 may also include a sensor data I/O module 270 for communicating with the various sensors in the system, and a user data I/O module 272 for communicating data concerning operations and instructions with a user, e.g., via the user interface 206.

In embodiments, operator interactions and instructions may be provided via a graphical user interface and a machine state indicator at the user interface 206. Various displays and tools may be available to the operator, including but not limited to a graphical status showing some or all motors, valves, and sensors; job information such as attributes of a malting program, a state of completion of the program, a ready state, and an error state; recipe information; an editing tool for recipe modification and note-taking; and fault handling tools.

Various modules in the system 200 may include a drum motor module 208 for controlling the rotation of a drum, a blower module 210 for controlling the operation of a blower, a heat exchanger module 212 for controlling the operation of a heat exchanger and/or a recuperator, and a hydronics module 214 for controlling the distribution of heated water streams to various components. For example, a drum motor module 208 may function with respect to a motor and drum of an automated germinating apparatus such as the drum 102 and motor 114 of the apparatus 100 shown in FIGS. 1-2. A motor controller 220 can receive instructions from the controller 202 to rotate a drum at a particular speed. A speed sensor 222 can detect the rotating speed, and the motor controller 220 can adjust the output to a drum motor accordingly. A motor controller 220 may also receive instructions from the controller 202 to stop the drum at a particular position, e.g., at an unloading position. In such a case, a position sensor 224 can communicate the position of the drum and cause the motor controller 220 to actuate a drum motor to turn the drum to the unloading position.

A blower module 210 can operate in a similar manner to the above. For example, a blower module 210 may receive instructions from the controller 202 to operate a blower at a particular air flow rate. The blower speed sensor 228 may detect an airflow speed or an airflow rate, and the flow rate controller 230 can cause a blower to speed up or slow down according to the desired airflow rate. In some cases, a blower motor controller 226 may shut off a blower when, for example, an air cycle is stopped.

A heat exchanger module 212 may receive instructions from the controller 202 to operate in a particular mode, as described above with respect to FIG. 6. For example, in a recirculating mode, the recirculation damper controller 232 may open a recirculation damper in the apparatus while the exhaust and intake damper controllers 234, 236 may close off the intake and exhaust system. Conversely, in an intake/exhaust mode, the recirculation damper controller 232 may close off a recirculation path via a recirculation damper, while opening up a path for exhausting and taking on environmental air. In some cases, the damper controllers 232, 234, 236 may work in concert to partially exhaust an exhaust flow of air, so as to take on some fresh air without losing all of the heat and humidity of the exhaust flow of air.

A hydronics module 214 may receive instructions from the controller 202 to heat or supply water to various components. For example, the water heat exchanger valves 238 may be operated to direct hot water from a hot water source, e.g., a water heat exchanger 110 (FIG. 1) to the drum 102 for germinating grain, or to the air heat exchanger 116, where the hot water may be used as a heat source for heating air. Hot water may be combined with cool or room-temperature water in order to achieve a suitable temperature range in either case. In some cases, a heater 240, such as a gas or electric water heater, may be used to heat a hot water reservoir and/or to further heat a flow of water prior to using the flow of water. A water pump controller 242 may be operated to increase or decrease a flow rate of water in a pump, e.g., the pump 122 (FIG. 2), for pumping water into or out of the drum 102 and/or for circulating hot water into the air heat exchanger 116.

As discussed above, valves may be located throughout the apparatus 100 at various external and internal connections, and between components, as required to control specific air, water and cleaning cycles described below. Sensors may also be mounted throughout the apparatus 100, e.g., within an interior of the drum 102 and at other connections, to measure temperature, carbon dioxide, humidity, flow rates, motor speeds, and/or the position of the drum.

In accordance with embodiments, an array of sensors 216 may be positioned throughout components of an automated germinating apparatus, such as the apparatus 100 shown in FIGS. 1-2, which may communicate information about the various components to the controller 202. For example, sensors may include one or more inner drum sensors 244, which may be embedded in the drum 102 for measuring temperatures within the drum. One or more air temperature sensors 236 may be embedded at upstream and downstream portions of the heat exchanger 116, and in ducts associated with the heat exchanger, for measuring the temperature and the temperature change within the heat exchanger. One or more water temperature sensors 248 may be embedded within the water heat exchanger 110, and within various pipes of the apparatus, such as the drum inlet pipe 162 and drum outlet pipe 164, as well as at the water inlet and outlet 180, 182 of the air heat exchanger 116, for measuring temperature of water in the hydronics system. Carbon dioxide sensors 250 may be embedded at various points upstream and downstream of the drum 102, or within the drum 102, for measuring the carbon dioxide content of the air in the intake and/or exhaust streams. Humidity sensors 252, 256 may also be positioned upstream and downstream of the drum 102 for measuring the humidity of air during a germinating process.

In accordance with embodiments, a collection of valves 218 may be positioned throughout components of the automated germinating apparatus 100 for controlling flow of air and water through the apparatus. For example, drum water inlet valves 258 may be provided at any suitable point in the water inlet pipe 162 to the drum 102 for facilitating or halting a flow of water to the drum 102. Drum water outlet valves 260 may be provided at any suitable point in the water outlet pipe 164 for facilitating or halting a flow of water out of the drum 102, e.g., for draining or filling the drum 102. Any or all of the above valves may be operably connected with the controller 202 via the network 204 for automatically actuating the valves.

The central conduit 138, air manifold 132, and radial tube array 134 are operable to facilitate air flow through the drum 102. The air manifold 132 can, in some cases, include a selective drum air outlet manifold to dynamically and selectively block air passage to some of the tubes of the radial tube array 134. In some cases, the air manifold 132 is static for selectively blocking air passage to some of the tubes of the radial tube array 134 based on, e.g., a height of the tubes.

Figure 8:
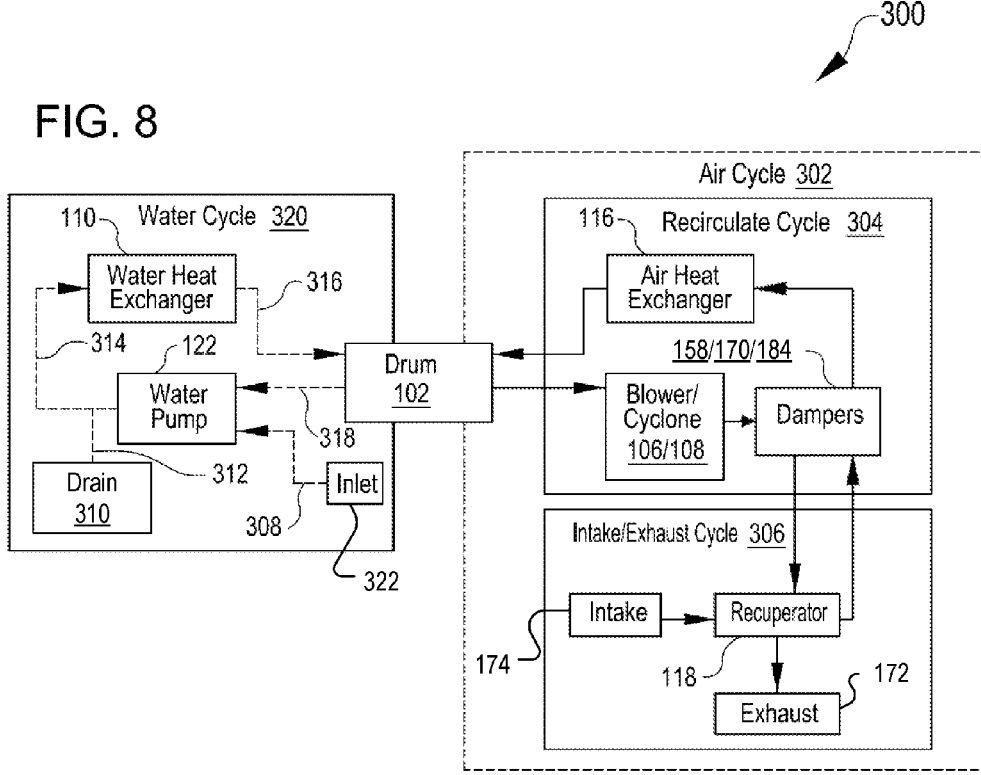
FIG. 8 is a block diagram illustrating air and water cycles for use in an automated germinating apparatus, in accordance with embodiments.

FIG. 8 shows a schematic of various air flow cycles 320 and water flow cycles 302 in accordance with embodiments, with references to components of the automated germinating apparatus 100 (FIG. 1). In at least one such embodiment of an air cycle 302, air drawn from an external source through the intake 174 is passed through both the recuperator 118 and the heat exchanger 116 and into the drum 102. Air exhausted from the drum 102 can be recirculated back through the heat exchanger 116 for maintaining a targeted temperature, or can be exhausted through the recuperator 118 to an exhaust 172.

Components for controlling air flow and temperature may include: a blower 106, or an electrical fan which powers the air flow at a specified velocity; a cyclone 108 or cyclone chamber to facilitate debris removal under certain conditions; a recuperator 118, which recovers energy from waste heat in exhausted air to be applied to incoming air depending upon the respective air temperatures; and an air heat exchanger 116, energized by an external hydronic system (not shown) or by a heating element (not shown), responsible for bringing the air to the targeted temperature. Air can be fully or partially recirculated by adjusting dampers 158, 174, and/or 184 which control the amount of external air that is mixed in with recirculated air. A central wedge-wire conduit 138 passes air into the drum while radial wedge-wire tubes 134 draw air from the drum interior through the grain bed passing out of the drum for recirculation or exhaust. A rotary union 104 may integrate the intake and exhaust plumbing with the drum, enabling unimpeded air flow while the drum is under rotation. For example, a drum manifold 132 may selectively close the radial tubes that are exposed above the grain bed, directing the air flow out through the grain bed. In some cases, a drum manifold may selectively open only radial tubes that are exposed above a predetermined level, for example, above the grain bed, in order to accommodate air exiting the drum while the drum is filled with water.

In various embodiments, air flow and temperature can be managed according to any of or a combination of: the target air temperature relative to the current air temperature; the target humidity level to maintain the humidity within the drum; the target carbon dioxide level to limit the carbon dioxide level within the drum; the fan speed which controls the air flow rate; or both the intake and exhaust dampers which can be fully or partially opened, or closed to control the mix of recirculated and fresh air. An air cycle may have several modes.

A first embodiment of an air cycle mode is an intake/exhaust cycle 306, where the blower 106 draws external air from the intake 174 through the recuperator 118 and into an open intake damper 170 before passing through the heat exchanger 116 and into the drum 102. From there the air flows out of the drum 102, through the blower 106, and exits the system through the exhaust damper 158, the recuperator 118 and the exhaust 172. In some embodiments, the exhaust 172 is connected with an exterior environment via an exhaust connection (not shown).

A second embodiment of an air cycle mode is a debris removal cycle, similar to the intake/exhaust cycle above except having a fan speed and drum rotation speed fast enough to activate a cyclone effect. After air passes back out of the drum and into the blower it may stagnate or spiral within the cyclone trapping any debris and causing the debris to fall by gravity into a collector attached to the cyclone.

A third embodiment of an air cycle mode is a recirculation cycle 304, where the blower 106 creates a recycling air flow through the heat exchanger 116 and into the drum 102. From there the air passes back out of the drum 102, through the blower 106 and back again to the heat exchanger 116 through the recirculation damper 184. The intake and exhaust dampers 170, 158 can be partially opened during recirculation to allow for a mix of fresh and recirculated air.

In various embodiments, a temperature controlled water cycle 320 may be used to wash and soak the grain. Water may be pumped 308 from an external source 322 through a pump 122, and pushed 314 to a heat exchanger 110 and transferred 316, e.g., via a water inlet pipe 162, into the drum 102. Water drained from the drum can be recirculated 318 back through the pump 122 and heat exchanger 110 to establish a targeted temperature, or water can be removed 312 from the system through an external drain 310.

Major components of the water cycle may include: a pump which circulates water through the system; a water intake achieved by opening an inlet valve connected to an external water source; water removal by opening a drain valve; a water heat exchanger for bringing water from the water intake to a targeted temperature; a drum inlet valve for controlling water flow into the drum; a drum outlet or sump valve for allowing water to be pumped out of the drum; and a rotary union to integrate the drum inlet and exhaust plumbing with the drum, enabling unimpeded water flow when the drum is under rotation.

The water cycle can be managed through any combination of one or more of: the target water temperature, to heat or cool the water dependent on current air temperature; the target water volume, to specify how much water should be in the drum; and the pump speed to control the water circulation rate. A water cycle may have several major modes.

A first embodiment of water cycle mode is an add water mode, where inlet valves can be opened while drain and drum pump valves can be closed so that water is pumped through a heat exchanger 110 and into the drum through the rotary union 128 and the drum inlet 162. Water can continue to fill the drum until a target volume is reached.

A second embodiment of a water cycle mode is a drain mode, where a drain and drum sump valve connected with the outlet pipe 164 can be opened while the inlet valve, e.g., a valve terminating the inlet pipe 162, is closed and the pump 122 draws the water from the drum through the pump.

A third embodiment of a water cycle mode is a wash mode, which may be a recirculating cycle where both the drum inlet valve and drum sump valves are opened so that water is cycled through the drum 102 and heat exchanger 110.

FIG. 9 shows a schematic of an example computer controller and networking system 500, in accordance with embodiments of an automated germination system, such as the system 200 (FIG. 7). The automated germination system may be managed by a microprocessor-based controller connected to all or a subset of the valves, motors and sensors throughout the machine, using either or both of wired and wireless connections. For example, a controller including a processor and onboard memory can have the capability to turn individual motors on or off and can set individual motors to specific rates. Valves can be fully or partially opened or closed. The controller can monitor the on-going process through environmental sensors including but not limited to temperature, humidity and carbon dioxide sensors.

In at least one embodiment, the networking system 500 can include a local area network interface or operations LAN 502 which can connect a machine controller 510 with networked servers such as a file server 504 and/or operations server 506 for information exchange. For example, job and recipe information may be downloaded from the file server 504 to the controller 202 (FIG. 2) to provide the process data needed on a given job, while status information and errors may be reported back from the controller 202 to the operations server 506 for remote monitoring. Process data may include, for example, instructions to enact one or more air cycle modes or water cycle modes in parallel or in series, for set lengths of time or until selected criteria have been met. The operations LAN 502 may be secured behind a global firewall 534 and connected to an external network (not shown) in order to allow the system 500 to receive additional information. In some embodiments, the operations LAN 502 may be connected via the global firewall 534 with the internet. A factory LAN 508 may include networked components secured from the operations LAN 502 by a second firewall 536. In some cases, the factory and operations LANs 508, 502 may overlap without an intervening firewall.

In some embodiments, the controller 202 can connect operably with various components for controlling aspects of the operation of the system. For example, the machine controller 202 may be wirelessly connected with controllers of valves 218 and sensors 216 via the factory LAN 508, and as describe above with reference to FIG. 7.

Description of the Operation of the Controlled Germination Apparatus:

FIG. 10 illustrates an example of a process 600 for operating an automatic germination apparatus, in accordance with embodiments. In at least one embodiment, the process 600 may be implemented via a system such as the system 200 shown in FIG. 7. The process 600 can include loading a batch of grain into a drum, such as the drum 102 of the automated germinating apparatus 100 (FIGS. 1-2) (act 602). The drum can be a variable speed Galland-style drum, which may be loaded and unloaded through a manually operated door at one end of the drum. Next, parameters of a germinating process can be set. (604) In some cases, setting parameters of a germinating process may include receiving instructions to follow predetermined parameters (e.g., for temperature, cycle step order, cycle step length, and similar parameters). In some cases, setting parameters of the process may include receiving instructions entered by a user.

Next, the process 600 can include washing the loaded grain with water at a washing temperature (act 606). Washing can generally include immersing the loaded grain in water and/or passing water through the grain in order to remove dirt and debris, and may include rotating the drum. In some embodiments, water is pumped from an inlet valve attached to an external water source, passing through a dedicated heat exchanger to raise or lower water temperature as required and supplied to the drum though a water rotary union containing both an inlet and outlet mounted on the drum end. When it is time to remove water from the drum, it may be pumped out and may be directed to a drain or recirculated back through the heat exchanger and returned to the drum. Water circulation may be controlled in accordance with one or more of the water cycle modes described above, e.g., in reference to FIG. 8. In some cases, the washing temperature of the water may range from about 50° F. to about 80° F.

Next, the process 600 can include steeping the washed grain by immersing the washed grain in a steeping flow of water (act 608). The grain may be fully or partially immersed in the steeping flow of water. In some embodiments, the steeping flow may fully immerse the grain and may be left in the drum for a predetermined period of time, according to the parameters of the germinating process. In some embodiments, the temperature of the immersing flow of water may range from about 40° F. to about 60° F. In some embodiments, the steeping procedure may be interrupted by one or more aeration cycles. The immersing flow of water may be periodically removed from the drum, and an aerating flow of air may be passed through the washed grain, before the washed grain is again immersed. In some embodiments, the system may determine whether the grain has reached target moisture content 610. If the grain has not reached target moisture content, the system may continue to immerse the washed grain for an additional length of time 608. In some cases, the system may asses moisture content in conjunction with periodically aerating the grain between steeping cycles 612, in which case the system can drain the steeping flow of water, and aerate the partially steeped grain with an aerating flow of air 614, prior to resuming the steeping process by again immersing the washed grain 608. Target moisture content may be any suitable moisture content for malting. In some specific embodiments, a target moisture content of the grain may range from about 40% to 50% by weight. The steeped grain can subsequently be rinsed (act 616).

Next, the process 600 can include a germinating stage, whereby the steeped grain is aerated while the drum is rotated (act 618). In some embodiments, the grain in the drum may also be maintained at a predetermined germinating humidity. In some cases, the germinating humidity is approximately 100%, at least 95%, or at least 90%. Aerating the grain can include passing a flow of air through the drum via, for example, the recirculation mode of the air cycle, the intake/exhaust mode of the air cycle, or a combination of both. The germinating stage may continue for a predetermined period of time, or may continue until the grain has sprouted. In some cases, system may determine that the grain has sprouted by, for example, measuring a carbon dioxide content in the drum or in the exhaust stream of air, the carbon dioxide content being indicative of germination in the batch of grain.

Next, the germinated grain can be kilned (act 620). For example, the germinated grain can be further dried of water content by passing a stream of hot air through the drum. In some cases, the stream of hot air may be at temperatures ranging from about 90° F. to about 200° F. In some cases, the germinated grain can be kilned until it reaches a second target moisture content. In some cases, the second target moisture content for kilning grain can be less than 5% by weight. The dried grain can be subsequently cooled to a handling temperature (act 622), e.g., via passing a stream of cooler air through the grain until it can be handled. In some cases, the stream of cooler air may range in temperature from approximately 80° F. to approximately 100° F. When sufficiently cooled, the dried grain can be unloaded from the drum (act 624).

In various embodiments, a computer may manage the system, controlling motors and valves and monitoring sensors to assess the status of the germinating process. A local area network interface can enable the system to connect to a remote server from which it receives recipes corresponding to a customized formula for each malting job while reporting back log data and other operational status. The operator may be able to interact with the computer through a graphical user interface and may be able to perform such functions as view status, edit a recipe, and initiate or pause any suitable operational functions.

Embodiments of the system may be operated by, in the computer controller or other hardware or software management module, setting an operating mode or high-level mode, including, for example: recipe mode, pause mode, and clean-in-place mode. The operating, or high-level modes include subsets of one or more of the air cycle and water cycle modes described above, in addition to other instructions.

In at least one embodiment of recipe mode, the operator can load the machine with grain and initiate a specific recipe causing the machine to execute a sequence of pre-defined high-level steps. For example, the process 600 (FIG. 10) illustrates one exemplary sequence, but other sequences of steps are possible. Each step may be interpreted by the machine to activate specific functions and valves, for example one or more of the water cycle modes and air cycle modes, in sequence or in parallel, while monitoring specific sensors and responding conditionally to various events. Events may include, for example: a temperature in the drum reaching or exceeding a pre-set range; a pre-set period of time having elapsed; a water level reaching or exceeding a pre-set range; or any other condition. Certain events, such as any which may indicate that the process has strayed outside of desired parameters, may be referred to as fault conditions. The machine's display and status indicator is maintained and status is reported back to the operations server at selected intervals. Under some conditions the machine is paused (or proceeds to pause mode, below) to allow for operator intervention. After all recipe steps have been completed, the machine will halt, signaling completion on both the display and status indicator, alerting the operator to unload the finished product from the machine.

In at least one embodiment of pause mode, the machine is paused at the direction of the operator, as defined by the active recipe, or because of a fault condition. When the machine is paused it may require a manual restart by the operator.

Embodiments may also include a clean-in-place (CIP) system. In at least one such embodiment, the clean-in-place system meets the stringent quality requirements of food-grade production. For example, embodiments of such a system, under computer control, remove all debris and add a cleaning solution distributed to the drum interior and a subset or all of the other internal surfaces, nozzles, valves including the air handling system. All surfaces are washed, rinsed and dried in this manner, and the machine made ready for the next job. In at least one embodiment of the clean-in-place mode; a built-in program steps the machine through a clean-in-place process, as described above.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus for germinating grain, the apparatus comprising:
   a rotatable drum configured for holding grain;
   an air conduit in the rotatable drum for directing an intake flow of air into the rotatable drum, the air conduit fixed to rotate with the rotatable drum;
   an array of tubes distributed circumferentially in the rotatable drum for withdrawing an exhaust flow of air from the rotatable drum, the array of tubes fixed to rotate with the rotatable drum;
   an air rotary union comprising an air manifold fluidly connecting the air conduit with a drum air inlet that is outside of the rotating drum and is fixed so that it does not rotate with the rotating drum, and fluidly connecting the array of tubes with a drum air outlet that is outside of the rotating drum and is fixed so that it does not rotate with the rotating drum, the fluid connection maintained during rotation of the rotating drum, wherein the air manifold is movable to selectively pass air through a dynamically selectable subset of the array of tubes;
   a blower configured to draw the exhaust flow of air from the air rotary union via the drum air outlet; and
   an inlet pipe in the rotatable drum for inserting an inlet flow of water into the rotatable drum.

2. The apparatus of claim 1, further comprising:
   an outlet pipe in the rotatable drum and fixed to rotate with the rotatable drum and for withdrawing an outlet flow of water from the rotatable drum; and
   a water rotary union fluidly connecting the inlet pipe with a water inlet that is outside the drum and does not rotate with the drum and fluidly connecting the outlet pipe with a water outlet that is outside the drum and does not rotate with the drum, such that fluid connection between the inlet pipe and the water inlet is maintained during rotation of the rotating drum and fluid connection between the outlet pipe and the water outlet is maintained during rotation of the rotating drum.

3. The apparatus of claim 1, wherein the air conduit further comprises a wedge-wire conduit, and wherein each tube of the array of tubes further comprises a wedge-wire tube.

4. The apparatus of claim 1, further comprising a heat exchanger assembly fluidly connected with the conduit, the heat exchanger assembly comprising:
   an air intake configured for taking in the intake flow of air from an external source;
   an air exhaust configured for exhausting the exhaust flow of air;
   a recuperator configured to conduct heat between the exhaust flow of air and the intake flow of air; and
   a heat exchanger downstream of the recuperator in a flow direction of the intake air and configured to add heat to the intake flow of air.

5. The apparatus of claim 4, further comprising an air diverter assembly fluidly connected with the heat exchanger assembly, the air diverter assembly comprising:
   an intake damper in fluid communication with the air intake via the recuperator and in fluid communication with the heat exchanger, wherein the intake damper can, in an open position, allow the intake flow of air to enter the heat exchanger, and in a closed position, prevent the intake flow of air from entering the heat exchanger.

6. The apparatus of claim 5, wherein the air diverter assembly comprises:
   a diverter having a diverter inlet, a first diverter outlet, and a second diverter outlet, the first diverter outlet being fluidly connected with the heat exchanger and upstream of the heat exchanger, and the second diverter outlet being fluidly connected with the recuperator, wherein:

in a recirculating configuration, the diverter can direct the exhaust flow of air via the first diverter outlet into the heat exchanger and can prevent the exhaust flow of air from exiting the second diverter outlet, in an intake configuration, the diverter can direct the exhaust flow of air via the second diverter outlet into the air exhaust via the recuperator and can prevent the exhaust flow of air from exiting the first diverter outlet, and in a partial intake configuration, the diverter can direct the exhaust flow of air via both the first diverter outlet and the second diverter outlet, such that a portion of the exhaust flow of air can mix with the intake flow of air in the heat exchanger.

7. The apparatus of claim 6, further comprising a cyclone assembly fluidly connected between the drum air outlet and the blower, the cyclone assembly comprising:

a cyclone cavity configured to receive the exhaust flow of air and cause a vortex to occur in the exhaust flow of air, such that debris may fall out of the exhaust flow of air via the vortex; and a waste container connected with the cyclone cavity and arranged to collect the debris.

8. The apparatus of claim 1, further comprising a water heat exchanger fluidly connected with the water inlet pipe and configured to add heat to the inlet flow of water.

9. The apparatus of claim 8, further comprising:

an outlet pipe in the rotatable drum for withdrawing an outlet flow of water from the rotatable drum, wherein the water heat exchanger is further connected with the outlet pipe and configured to transfer heat from the outlet flow of water to the inlet flow of water.

10. The apparatus of claim 1, wherein:

each tube of the array of tubes is positioned proximate to an interior wall of the rotatable drum such that, when the rotatable drum is rotated, the tubes of the array of tubes rotate with the drum.

11. The apparatus of claim 1, wherein the air manifold is configured to receive the exhaust flow of air from the subset of the array of tubes, the subset comprising tubes above or below a predetermined height in the rotatable drum.

12. The apparatus of claim 1, wherein the air manifold is configured to receive the exhaust flow of air from the subset of the array of tubes, the subset comprising tubes at one or more ranges of rotational positions relative to the air manifold.

13. The apparatus of claim 1, wherein the air manifold is further configured to reverse a flow of air such that the air conduit in the rotatable drum is further configured for withdrawing the exhaust flow of air from the rotatable drum, and the array of tubes in the rotatable drum is further configured for directing the intake flow of air into the rotatable drum.

14. A system for malting grain, the system comprising:

a rotatable drum configured for holding grain;

an array of tubes distributed circumferentially in the rotatable drum for withdrawing an exhaust flow of air from the rotatable drum, the array of tubes fixed to rotate with the rotatable drum;

an air rotary union comprising an air manifold, fluidly connecting the array of tubes with a drum air outlet that is outside of the rotating drum and is fixed so that it does not rotate with the rotating drum wherein the fluid connection is maintained during rotation of the rotating drum;

an air cycle module configured to control an air flow rate and an air temperature of a flow of air through the drum;

a water cycle module configured to control a water flow rate and a water temperature of a flow of water through the drum; and a controller having a processor and memory configured with executable instructions to execute a sequence of pre-defined operations on one or more of the air cycle module, the water cycle module, and the rotatable drum, the sequence being defined to malt grain within the drum; the controller further configured to selectively cause the air manifold to pass air through a subset of the array of tubes.

15. The system of claim 14, wherein the air cycle module comprises at least an air temperature sensor and a first heat exchanger, the air temperature sensor being configured to detect the air temperature of the flow of air, and the air cycle module being configured to, when the air temperature is below a target air temperature, heat the flow of air via the first heat exchanger.

16. The system of claim 15, wherein the air cycle module further comprises an air intake and an inlet damper fluidly connecting the first heat exchanger with the air intake, and wherein the air cycle module is further configured to, when the air temperature is at or above a target air temperature, entrain an intake flow with the flow of air via the inlet damper.

17. The system of claim 16, wherein the water cycle module further comprises a water temperature sensor and a second heat exchanger, and wherein the water temperature module is further configured to, when the water temperature is below a target water temperature, heat the flow of water via the second heat exchanger.

18. The system of claim 14, wherein the controller is further configured to receive user instructions, wherein the user instructions define in part the sequence of pre-defined operations.

19. The apparatus of claim 1, further comprising a bed of grain, wherein the subset of the array of tubes is selected depending on an angle of the bed of grain in the rotatable drum.

20. The apparatus of claim 1, wherein the air manifold is movable to select tubes from the array of tubes over a range of arc angles greater than 180 degrees such that a remainder of the array of tubes not selected extend over a range of arc angles in the range from 70 degrees to 180 degrees.

* * * * *